United States Patent Office 2,970,918
Patented Feb. 7, 1961

2,970,918

TOPPING AND CONFECTIONARY COMPOSITION AND METHOD OF PRODUCING THE SAME

Olga Petersen, 248 Louette Court, Hayward, Calif.

No Drawing. Filed Mar. 12, 1959, Ser. No. 798,841

6 Claims. (Cl. 99—139)

The present invention relates, in general, to compositions for use as decorative finishes or structural components of bakery, fountain or confectionary goods and, more particularly, to compositions of the character described having a high sugar content and which are stable in storage as well as a simplified method of manufacture therefor.

Compositions employed as icings and frostings for bakery goods, toppings for fountain or confectionary items and fillings for such products are generally compounded at room and/or elevated temperatures. Difficulties are frequently encountered in such methods if sucrose and other crystalline sugars are employed in major proportions especially if the basic creaming operation employs butter or other solid, liquid or semi-liquid fatty materials. The sugar does not readily disperse in the mixture without heating and other complicated operations to produce the fine, smooth creamy consistency desired in said compositions. Moreover, upon storage the crystal grains generally grow in size yielding an undesirable "sugary" texture or "sandiness" therein wherefore the material must be employed promptly.

I have now found that excellent compositions for the indicated purpose can be prepared with high proportions of powdered sucrose and similar powdered crystalline sugars. This highly advantageous result is obtained by employing a frozen or semi-frozen creaming base dispersion having a composition somewhat similar to those characterized as ice creams, ice milk, sherbet, and similar materials which include water as very finely divided crystals. In ordinary mixing machinery the sugar is found to blend rapidly with proper proportions of the creaming base dispersion yielding a cold creamy composition containing the sugar in a very finely-divided state. Such composition may be employed shortly after mixing or stored under refrigeration for lengthy periods of time without deterioration or deleterious change in texture. Suprisingly, the material may be stored in freezing compartments and used immediately after removal without softening for frostings, fillings, toppings and the like.

Accordingly, it is an object of my invention to provide compositions for use as frostings, icings, toppings, fillings, etc., for use in preparing various bakery, fountain and confectionary products.

Another object of my invention is to provide compositions and methods of producing compositions of the character described which compositions retain a fine creamy texture upon storage.

Still another object of my invention is to provide a low temperature method of manufacturing high crystalline sugar content compositions of the character described.

A further object of my invention is to provide a method of producing high crystalline sugar content frosting, topping and filling compositions employing a frozen or semi-frozen creaming base dispersion into which the sugar is incorporated.

A still further object of my invention is to provide frosting, topping and filling compositions having a high normally crystalline sugar content and which retains a fine textured creamy texture in storage.

The invention possesses other objects and features of advantage, some of which, with the foregoing, will be set forth in the following description including a preferred form of the invention. It is to be understood, however, that variations in the showing made by the said description may be adopted within the scope of the invention as set forth in the claims.

In general in preparing the composition of my invention there is first prepared a creaming base dispersion which comprises certain basic ingredients including various proportions of fat and non fat milk solids, minor proportions of sugar or sugar like materials, stabilizers, emulsifiers and various optional materials described more fully hereinafter in a water dispersion. The creaming base dispersion is frozen in ice cream freezing equipment with overrun and is hardened if necessary to yield a creaming base dispersion in which the water is principally in a very finely divided ice crystal form. Subsequently, a several-fold proportion of a powdered crystalline sugar is mechanically blended with the creaming base to provide the product composition which may be utilized as such, stored and utilized later or be employed with appropriate modification to provide a wide variety of toppings, fillings, frostings, etc.

More particularly, the creaming base which is employed in formulating the composition of my invention can be prepared with the following proportions and types of ingredients as in conventional ice cream manufacturing practice:

| | Range, percent, wt. | Typical, percent |
|---|---|---|
| Fat | 8.0–22.0 | 12.5 |
| Non fat milk solids | 6.0–14.0 | 10.0 |
| Sugar | 12.0–18.0 | 15.0 |
| Stabilizer and Emulsifiers | 0.0–0.7 | 0.25–0.50 |
| Egg solids (optional) | 0.0–1.0 | |
| Salt | 0.0–0.1 | |

The remainder is made up of water added to the other components or derived from usual sources of said components.

In addition to the foregoing coloring and flavoring materials may be added or such materials may be added when utilizing the creaming base in formulating the final composition or at any time prior to final use.

The fat and non fat milk solids may be supplied by one or more dairy products such as whole milk, cream, condensed skim or whole milk, sweet unsalted butter, butter oil, plastic cream, milk albumin, malted milk, delactosed milk, etc. The sugar component usually is supplied by beet or cane sugar, dextrose, glucose, cane sugar, invert sugar and honey either alone or preferably in admixture.

Eggs either in whole form or powdered yolk when employed act as an emulsifier tending to yield more finely divided and stable dispersions. Stabilizers usually used in preferred amounts of about 0.50% include gelatin, sodium alginate, gum tragacanth, India gum, karaya gum, Irish moss, agar-agar, pectin, sodium carboxy methyl cellulose, etc. Mono- and di-glycerides of fatty acids, lecithin, sorbitan monostearate, polyethylene glycol esters, etc., are used in amounts of about 0.25–0.50%.

The ingredients for the creaming base are combined in conventional mixing equipment with homogenization, if necessary, to provide a finely-divided fluidic dispersion. Generally, it is preferred that the milk portions be pasteurized and homogenized or the fluidic dispersion be homogenized to provide a more stable and creamy product. In such a homogenized material maximum particle size will be of the order of 4 microns and average size of about 2 microns which fine article size is believed to contribute to the beneficial results as described hereinafter.

Conventional batch or continuous ice cream freezing equipment is employed to freeze the fluidic dispersion. With batch equipment 2–4 hours treatment generally results in about 50–60% of the water being converted into minute ice crystals with coincident production of a very thick or semi-solid consistency, e.g., with a temperature of about 18–25° F. During mixing air is also incorporated into the dispersion whereby the volume may be increased from about 25 to 150%. For present purposes an increase in volume or "overrun" of about 30–80% is most suitable, i.e., weight of 4–6 lbs. per gallon.

While the foregoing "soft" frozen creaming base dispersion may be employed with some success in producing the desired composition, "hard" frozen base is somewhat more reliable. Hard freezing is accomplished by disposing the soft frozen base in suitable containers placed in cold storage rooms at below about 15° F. until essentially all of the water is frozen into minute ice crystals.

The proportions of the above ingredients can be varied considerably and other ingredients (besides color and flavorings) added without serious effect upon the final result. For example, a product produced from a typical mix (similar to that supra) in an amount of about 10% (dry basis) giving about 5% milk solids combined with 28% sucrose and dextrose, 20% fruit juices (citrus 0.30–0.40% lactic acid equivalent), 0.22% each of pectin and gelatin, and 41.5% of water thoroughly dispersed and "hard frozen" produced a satisfactory product although of a little less creamy texture.

A semi-frozen or preferably a hard frozen creaming base dispersion prepared as above or a similar material produced as in conventional ice cream manufacturing practice is combined with a several-fold quantity of powdered crystalline sugar. Powdered sucrose (cane or beet sugar) is ordinarily employed; however, other crystalline sugars may be substituted in part, if desired. A ratio of 25 lbs. powdered sugar to one gallon of typical frozen creaming base dispersion such as that described above is preferred. With usual values of overrun (50–70%) one gallon of such dispersion will weigh about 5–6 lbs. and appropriate compensation on a weight basis is made if overrun deviates substantially therefrom. When the proportion of powdered sugar is reduced to too low a level the product mixture becomes too fluid for the indicated purpose and if the proportion of sugar is increased above certain limits they cannot be mixed or "kneaded" properly and the mixture is too thick and dry. Accordingly, textural and fluid properties, visually observed, can be employed to regulate proportions in the event that overrun or other factors are not known with certainty. Although different combinations of ingredients will have some effect on final results, suitable mixtures are generally obtained in a fairly narrow range, e.g., 20 to 30 lbs. of powdered sugar to one gallon of frozen creaming base dispersion, i.e., of 4–6 lbs./gallon.

The powdered sugar and frozen creaming base dispersion are combined in conventional mixing or kneading equipment designed for viscous liquids or soft doughs. Alternate additions of the ingredients are made with precautions against rapid softening of the creaming base dispersion before substantial amounts of the powdered sugar is incorporated therein. Flavoring and coloring ingredients may also be added at this stage. Mixing or kneading of the mixture is continued until a fine, creamy, lump-free texture is obtained. Sufficient proportions of sugar are employed to yield proper frosting, topping or filling consistency, as indicated above, to suit desired purposes.

Subsequent to mixing the product composition is packaged and may be stored under ordinary refrigeration or in deep freeze storage for extended periods of time without deterioration. Even when stored at temperatures of below 15° F. the composition retains spreading consistency. Moreover, due to the high sugar content the composition can be stored at room temperature for substantial periods of time.

As may be noted the present method produces a composition which is similar in appearance to cooked frostings, fillings, etc., with an average temperature which is below room temperature. Although the phenomena are not fully understood it is thought that the highly dispersed and emulsified state of fats and other ingredients are an important factor. Likewise, the extremely fine particle size of the ice crystals is believed important. During mixing such ice crystals are able to disperse thoroughly into the powdered sugar without a rapid initial solution of the sugar with the other small particle size ingredients being simultaneously dispersed. As mixing progresses the ice crystals melt to dissolve some of the sugar and with the other ingredients serves to cement the fine particle size sugar crystals into a viscous, emulsified, thixotropic fluidic mixture. The starch (cornstarch 3%) of the powdered sugar is slowly solvated and is believed to act as a stabilizer for the mixture together with various ingredients of the creaming base. Due, perhaps, to the presence of an exceedingly large number of nucleating particles and/or the stabilizing influence of said ingredients the sugar particles do not increase in size on storage. Therefore, a fine creamy texture is retained during storage.

*Example*

1 gallon of a high quality ice cream mixture weighing 5 lbs. was mixed with 25 lbs. of powdered sugar in a conventional type of mixer. Subsequent to storage at 20° F. for six months the composition was used for toppings and frostings. Texture, flavor and other properties were unchanged by storage.

What is claimed is:

1. A method for producing a composition suitable for use as frostings, fillings, toppings and the like, comprising producing a frozen creaming base dispersion, and mechanically combining said frozen dispersion with finely powdered crystalline sugar to produce said composition, said sugar being employed in a several-fold proportion relative to the dispersion yielding a composition stable toward deterioration in refrigerated storage and having a viscosity and texture characteristic of frostings, fillings and toppings.

2. A method for producing a composition suitable for use as frostings, fillings and toppings and which is stable under refrigerated storage conditions, comprising producing a frozen creaming base dispersion comprising essentially fat and non fat milk solids, minor proportions of sugar materials, stabilizers and emulsifiers and water, and mechanically combining said frozen creaming base dispersion with a several-fold major proportion of a powdered crystalline sugar to yield said composition.

3. The method as defined in claim 2 wherein said creaming base dispersion and sugar are employed in a ratio of 1 gallon to about 20 to 30 pounds, respectively.

4. The method as defined in claim 2 wherein said creaming base dispersion and sugar are employed in a ratio of 1 gallon to 25 pounds, respectively.

5. In a method for producing a composition suitable for use as frostings, fillings and toppings, the step comprising mechanically combining a frozen creaming base dispersion with a powdered crystalline sugar.

6. A composition having a creaming base phase including essentially fat and non fat solids with minor proportions of sugar materials, stabilizers and water and a several-fold proportion of powdered crystalline sugar in a stable finely divided state during refrigerated storage produced by the dispersion of said sugar in the creaming base while frozen.

References Cited in the file of this patent

UNITED STATES PATENTS

| | | |
|---|---|---|
| 990,168 | Scott | Apr. 18, 1911 |
| 2,619,422 | Diamond | Nov. 25, 1952 |
| 2,622,984 | Peebles et al. | Dec. 23, 1952 |
| 2,786,765 | Prince | Mar. 26, 1957 |